Patented Apr. 10, 1923.

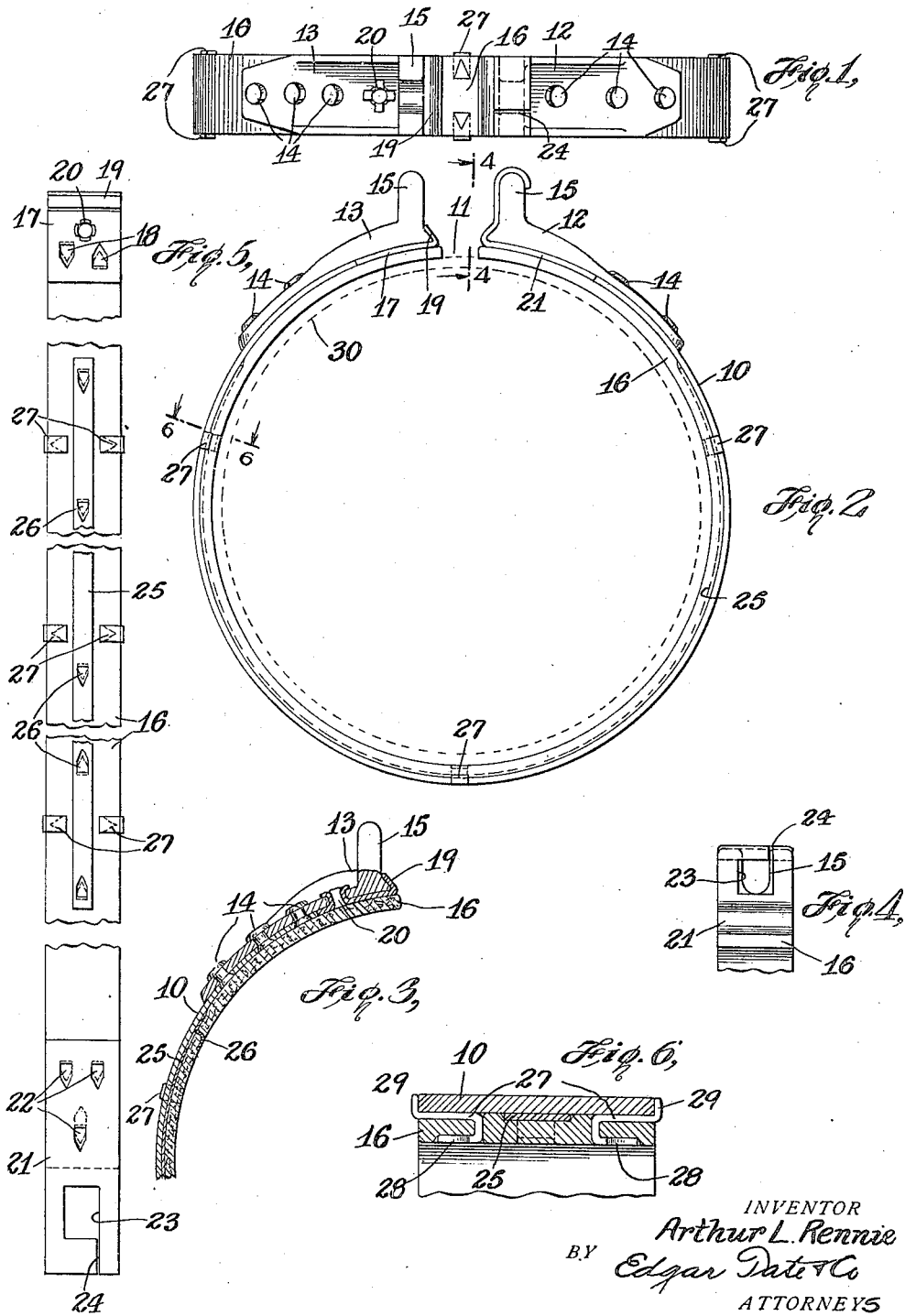

1,450,925

UNITED STATES PATENT OFFICE.

ARTHUR L. RENNIE, OF JAMAICA, NEW YORK.

BRAKE-BAND LINING.

Application filed March 7, 1922. Serial No. 541,647.

*To all whom it may concern:*

Be it known that I, ARTHUR L. RENNIE, a citizen of the United States, and residing at Jamaica, in the county of Queens and State of New York, have invented certain new and useful Improvements in Brake-Band Linings, of which the following is a specification, such as will enable those skilled in the art to which it appertains to make and use the same.

This invention relates to brake band linings and particularly to devices of this class adapted for use in planetary transmission constructions, and the object of the invention is to provide a device of the class specified which is so constructed as to facilitate its connection with and detaching from brake bands in constructions of the class specified, whereby considerable time and labor are saved in the use thereof as compared with similar devices as heretofore constructed; a further object being to provide means for reinforcing the lining to prevent the same from being dissected or pulled apart when the same has become worn; and with these and other objects in view the invention consists in a device of the class and for the purpose specified, constructed as hereinafter described and claimed.

The invention described and claimed herein is an improvement on that described and claimed in my Patent No. 1,424,852, and said invention is fully disclosed in the following specification, of which the accompanying drawing forms a part, in which the separate parts of my improvement are designated by suitable reference characters in each of the views, and in which—

Fig. 1 is a plan view of a brake band showing my improved lining mounted in connection therewith;

Fig. 2 a side view of the construction shown in Fig. 1;

Fig. 3 a longitudinal section through one end portion of the brake band with my improved lining mounted in connection therewith;

Fig. 4 a detail view looking in the direction of the arrows 4—4 of Fig. 2;

Fig. 5 a plan view of the brake band lining strip detached with parts of the construction broken away; and, Fig. 6 a partial section on the line 6—6 of Fig. 2 on an enlarged scale.

In Figs. 1 and 2 of the drawing, I have shown at 10 a brake band such as commonly employed in planetary transmissions gears or devices, and this band is open at one side as shown at 11, and the free end portions thereof are provided with bracket plates 12 and 13 riveted to the band 10 as shown at 14 and having upwardly directed yoke portions 15 through which the usual clamping bolts, not shown, are adapted to pass, and at 16, I have shown my improved brake band lining strip which is composed, as shown, of fibrous material, and one end portion of said strip is provided with an attaching plate 17 secured to said strip by prongs or the like 18 stamped from said plate, and the end of the plate is provided with an upwardly and inwardly directed hook-shaped lip or flange 19 adapted to engage the bracket 13, and said plate is also provided with an outwardly directed tubular rivet member 20 which is adapted to pass through an aperture in the bracket 13, as clearly shown in Fig. 3 of the drawing.

Secured to the other end portion of the strip 16 is an attaching plate 21 which is secured to said strip by prongs 22, or the like, stamped therefrom, as clearly shown in Fig. 5 of the drawing, and the free end of said plate is adapted to be passed upwardly around the yoke 15 of the bracket 12 as shown in Figs. 1 and 2, and said end is provided with an elongated aperture 23 through which the bolt may be passed, and the end of said attaching plate is preferably split as shown at 24.

Mounted upon the outer face of the brake band lining strip 16 is a thin metal strip 25 which is of considerable less transverse dimensions than the strip 16 and is secured to the lining strip 16 by prongs or the like 26 stamped from the material of the strip 25, as clearly shown in Figs. 3 and 5 of the drawing. At predetermined points along the opposite side edges of the lining strip 16 are secured pairs of guide clips 27, which are secured to the strip 16 by prongs passed therethrough and compressed thereinto as shown at 28 in Fig. 6 of the drawing, and said clips are provided with outwardly directed portions 29 which are adapted to engage the side edges of the brake band 10, as clearly shown in Figs.

2 and 6 of the drawing to hold the lining strip 16 against lateral displacement on said band 10.

The lining strip 16 is attached or mounted in connection with the brake band 10 by passing the attaching plate 21, which is normally in an extended position between the bracket 13 and the usual drum 30 indicated in dotted lines in Fig. 2 of the drawing and moving the same around said drum until the attaching plate 17 is in proper position, in which operation the clips 27 will guide the lining strip 16, and when in proper position the free end of the attaching plate 21 is bent upwardly around the bracket 12 as clearly shown in Fig. 2 of the drawing, and the lining is now in position for use, and in the event of the wearing out or breaking of a portion of the lining strip 16, the metal strip 25 will serve to hold the same in position.

The distinctive features of the present invention is to provide a simple method of reinforcing the lining strip 16 by securing thereto a strip of thin metal 25 which is of considerable less transverse dimensions than the strip 16 to produce a flexible lining strip, or a strip of this class which is capable of inserting or mounting upon brake bands regardless of their construction, and by providing the separate clips 27 which are independent of the strips 25 the entire lining strip is rendered flexible, and while I have shown specific forms of attaching plates on the ends of the lining strip 16, it will be understood that I am not necessarily limited thereto, and other changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. A lining strip for brake bands provided on its outer face with a plurality of guide clips and with a narrow metal strip extending longitudinally of said lining strip, an attaching plate at one end of said lining strip, and means for securing said attaching plate in connection with the brake band.

2. A lining strip for brake bands provided on its outer face with a plurality of guide clips and with a narrow metal strip extending longitudinally of said lining strip, an attaching plate at one end of said lining strip, means for securing said attaching plate in connection with the brake band, and another attaching plate on the other end of said lining strip and adapted to be secured to the other end portion of said brake band.

3. The combination with a brake band provided at its free end with brackets, of a lining strip for said band, said lining strip being provided at predetermined points with guide clips adapted to engage the side edges of said brake band for holding said lining strip against lateral movement thereon, an attaching plate at one end of said lining strip, said attaching plate being adapted to be secured to one of said brackets, and a narrow reinforcing strip mounted upon and secured to the outer face of said lining strip and extending longitudinally thereof.

4. The combination with a brake band provided at its free end with brackets, of a lining strip for said band, said lining strip being provided at predetermined points with guide clips adapted to engage the side edges of said brake band for holding said lining strip against lateral movement thereon, an attaching plate at one end of said lining strip, said attaching plate being adapted to be secured to one of said brackets, and a reinforcing strip mounted upon and secured to the outer face of said lining strip and extending longitudinally thereof, said strip being independent of said clips and being of considerably less transverse dimensions than said lining strip.

5. The combination with a brake band provided at its free end with brackets, of a lining strip for said band, said lining strip being provided at predetermined points with guide clips adapted to engage the side edges of said brake band for holding said lining strip against lateral movement thereon, an attaching plate at one end of said lining strip, said attaching plate being adapted to be secured to one of said brackets, a reinforcing strip mounted upon and secured to the outer face of said lining strip and extending longitudinally thereof, said strip being independent of said clips and being of considerably less transverse dimensions than said lining strip, and an attaching plate on the other end of said lining strip and adapted to engage the other of said brackets for securely holding said lining strip in position.

6. The combination with a brake band provided at its free end with brackets, of a lining strip for said band, said lining strip being provided at predetermined points with guide clips adapted to engage the side edges of said brake band for holding said lining strip against lateral movement thereon, an attaching plate at one end of said lining strip, said attaching plate being adapted to be secured to one of said brackets, a reinforcing strip mounted upon and secured to the outer face of said lining strip and extending longitudinally thereof, said strip being independent of said clips and being of considerably less transverse dimensions than said lining strip, and an attaching plate on the other end of said lining strip and adapted to engage the other of said brackets for securely holding said lining strip in position, said last named attaching plate being provided with an aperture.

7. A brake band lining of the class described provided at one end with an attaching plate, means for securing said plate in connection with a suitable support, a reinforcing strip mounted upon and secured to the outer face of said lining strip, and means independent of said last named strip and mounted in connection with said lining strip for holding said lining strip in predetermined position on a brake band.

8. A brake band lining of the class described provided at one end with an attaching plate, means for securing said plate in connection with a suitable support, a reinforcing strip mounted upon and secured to the outer face of said lining strip, means independent of said last named strip and mounted in connection with said lining strip for holding said lining strip in predetermined position on a brake band, and another attaching plate mounted in connection with the other end portion of said strip.

In testimony that I claim the foregoing as my invention I have signed my name this 2nd day of March, 1922.

ARTHUR L. RENNIE.